(12) United States Patent
Hoeller et al.

(10) Patent No.: US 11,768,970 B2
(45) Date of Patent: Sep. 26, 2023

(54) SECURE COMPUTING DEVICE

(71) Applicant: Infineon Technologies AG, Neubiberg (DE)

(72) Inventors: Andrea Hoeller, Graz (AT); Walther Pachler, Wetzelsdorf (AT)

(73) Assignee: Infineon Technologies AG, Neubiberg (DE)

(*) Notice: Subject to any disclaimer, the term of this patent is extended or adjusted under 35 U.S.C. 154(b) by 410 days.

(21) Appl. No.: 16/694,361

(22) Filed: Nov. 25, 2019

(65) Prior Publication Data

US 2020/0167507 A1 May 28, 2020

(30) Foreign Application Priority Data

Nov. 26, 2018 (DE) .......................... 102018220284.2

(51) Int. Cl.
*G06F 21/84* (2013.01)
*G06F 21/74* (2013.01)

(52) U.S. Cl.
CPC .............. *G06F 21/84* (2013.01); *G06F 21/74* (2013.01); *G06F 2221/2105* (2013.01)

(58) Field of Classification Search
None
See application file for complete search history.

(56) References Cited

U.S. PATENT DOCUMENTS

| | | | | |
|---|---|---|---|---|
| 6,072,875 A * | 6/2000 | Tsudik | ..................... | H04L 63/08 |
| | | | | 455/433 |
| 8,082,585 B1 * | 12/2011 | Givonetti | .............. | G06F 21/567 |
| | | | | 713/188 |
| 10,009,341 B1 * | 6/2018 | Vieux | .................... | H04L 9/0863 |
| 2005/0182971 A1 * | 8/2005 | Ong | ........................ | G06F 21/34 |
| | | | | 726/19 |
| 2005/0289353 A1 * | 12/2005 | Dahlke | ................. | G06F 21/575 |
| | | | | 713/182 |
| 2008/0105751 A1 * | 5/2008 | Landau | ................ | G06Q 20/409 |
| | | | | 235/492 |
| 2013/0111219 A1 * | 5/2013 | Avanch | ................... | G06F 21/00 |
| | | | | 713/189 |
| 2013/0151859 A1 * | 6/2013 | Riell | ....................... | G06F 21/41 |
| | | | | 713/184 |

(Continued)

FOREIGN PATENT DOCUMENTS

| | | | | |
|---|---|---|---|---|
| CN | 106100851 A | * | 11/2016 | .......... H04L 9/0897 |
| DE | 102015211540 A1 | | 12/2016 | |
| EP | 2988245 A1 | | 2/2016 | |

OTHER PUBLICATIONS

German Patent Office, Office Action issued for DE 102018220284. 2, 8 pgs., dated Aug. 9, 2019.

*Primary Examiner* — Michael Pyzocha (74) *Attorney, Agent, or Firm* — Banner & Witcoff Ltd.

(57) ABSTRACT

A secure computing device having a storage arrangement configured to store a secret. The secure computing device includes a first interface configured to control a display, and a second interface configured to receive an input signal having information which reproduces a prompt to display the secret. The secure computing device is designed to read the secret from the storage arrangement on the basis of the input signal, and to control the display via the first interface in such a way that a display of the secret is effected.

20 Claims, 7 Drawing Sheets

(56) References Cited

U.S. PATENT DOCUMENTS

| | | | |
|---|---|---|---|
| 2014/0056171 A1* | 2/2014 | Clegg | H04W 12/06 |
| | | | 370/254 |
| 2014/0123320 A1* | 5/2014 | Isozaki | G06F 21/74 |
| | | | 726/29 |
| 2014/0230067 A1* | 8/2014 | Sahita | G06T 1/60 |
| | | | 726/26 |
| 2014/0344889 A1* | 11/2014 | Lee | G06F 21/54 |
| | | | 726/1 |
| 2015/0049014 A1* | 2/2015 | Saito | G09G 5/00 |
| | | | 345/156 |
| 2015/0200947 A1* | 7/2015 | Takishita | H04M 1/0247 |
| | | | 715/743 |
| 2015/0363584 A1* | 12/2015 | Chu | G06F 21/31 |
| | | | 726/28 |
| 2016/0080154 A1* | 3/2016 | Lee | H04L 9/3234 |
| | | | 713/185 |
| 2016/0191494 A1* | 6/2016 | Claes | G06F 21/31 |
| | | | 713/159 |
| 2016/0323267 A1* | 11/2016 | Sun | H04W 12/086 |
| 2017/0164201 A1* | 6/2017 | Li | G06F 21/57 |
| 2017/0193236 A1* | 7/2017 | Wang | G06F 21/74 |
| 2017/0228528 A1* | 8/2017 | Yang | G06F 21/32 |
| 2018/0035293 A1* | 2/2018 | Elnekaveh | H04L 9/3215 |
| 2018/0108018 A1* | 4/2018 | Lee | G06V 40/1365 |
| 2018/0285546 A1* | 10/2018 | Greenberg | H04L 9/0891 |
| 2019/0166103 A1* | 5/2019 | Tobias | G06F 1/163 |
| 2019/0325427 A1* | 10/2019 | Frollini | G06Q 20/3223 |
| 2020/0097167 A1* | 3/2020 | Hattori | G06F 1/1698 |

* cited by examiner

SECURE COMPUTING DEVICE

TECHNICAL FIELD

The present disclosure relates to a secure computing device ("secure element") and to an apparatus with a secure computing device. The present disclosure further relates to a hardware firewall for user interfaces.

BACKGROUND

Secret information, such as passwords and the like, can be stored in electronic data storage devices. A need exists to store secret information reliably therein in order to enable a reliable access thereto, but simultaneously to enable a protection of the data against unauthorized access.

Secure computing devices and apparatuses with secure computing devices which enable a high security of stored secret information would accordingly be desirable.

SUMMARY

Example embodiments provide a secure computing device having a storage arrangement which is configured to store a secret. The secure computing device has a first interface which is configured to control a display device and has a second interface which is configured to receive an input signal having information which reproduces or contains a prompt to display the secret. The secure computing device is designed to read the secret from the storage arrangement on the basis of the input signal and to control the display device via the first interface in such a way that a display of the secret is effected. This enables the secure computing device to take control of the display device, and a forwarding of the secret information to another, possibly unsecured, control unit is reduced, avoided or prevented, so that an attack on a control unit circumvented in this way can remain ineffective.

According to one example embodiment, an apparatus comprises a secure computing device and a display device which is connected to the first interface.

Further example embodiments are defined in the dependent patent claims.

BRIEF DESCRIPTION OF THE FIGURES

Example embodiments are explained below with reference to the accompanying drawings, in which.

DETAILED DESCRIPTION

Before example embodiments are explained in detail below with reference to the drawings, it should be noted that identical, functionally similar or similarly acting elements, objects and/or structures are denoted with the same reference numbers in the different figures, so that the descriptions of these elements presented in the different example embodiments are mutually exchangeable or can be applied to one another.

Figure 1:
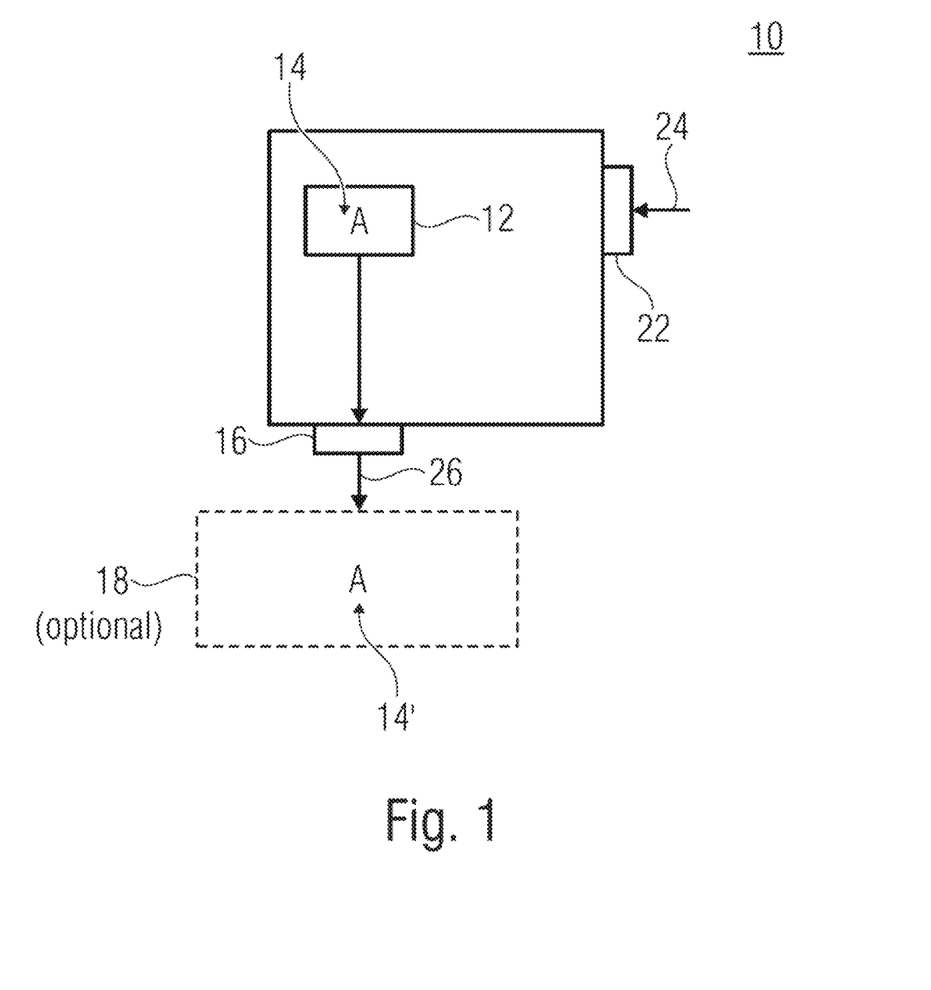
FIG. 1 shows a schematic block diagram of a secure computing device according to one example embodiment.

FIG. 1 shows a schematic block diagram of a secure computing device 10 according to one example embodiment. The secure computing device 10 comprises a storage arrangement 12 which is configured to store a secret 14. The secret 14 may comprise or may be information to be kept at least temporarily secret, for example a password, a token, a key, for example a private key, and/or a random number which is used as a starting point ("deterministic seed") for the calculation of further information. The secret 14 or the information contained therein can be stored in any format and/or state and/or variation, for example in a multiplicity of storage cells of the storage arrangement 12. The storage arrangement 12 can have a volatile or non-volatile storage device which is designed to store and reproduce information.

The secure computing device 10 comprises an interface 16 which is configured to control a display device 18. The display device 18 may be part of the secure computing device 10, but may also be part of a different apparatus and may be optional in relation to the secure computing device 10. The display device 18 can be designed to output one or more display signals, for example audible, haptic and/or visual display signals. According to one example embodiment, the display device 18 can comprise a loudspeaker, a unit to generate haptic information, such as a vibration element, and/or a visual indicator, for example a display, in particular comprising light-emitting diodes (LEDs).

The secure computing device 10 comprises an interface 22 which is designed to receive an input signal 24. The input signal 24 may be an electrical, visual, haptic or audible signal. The input signal 24 can be obtained, for example, from an application, a different secure computing device/processor and/or from a user, for example via a key press. The input signal 24 may have information indicating that the secure computing device 10 is prompted to reproduce the secret 14.

The secure computing device 10 is designed to read the secret 14 from the storage arrangement 12 on the basis of the input signal 24 and to control the display device 18 via the interface 16 in such a way that a display 14' of the secret 14 is effected. This means that the display 14' is a representation of the secret 14, e.g. an audible, haptic and/or visual form of the bit sequence which is stored in the storage arrangement 12 and represents the secret 14. This may comprise a sound, a sound sequence, a noise, a sequence of haptic information elements or movements and/or a graphical display of the secret 14. According to one example embodiment, the secret 14 may be displayable, for example, as a QR code or digit sequence in order to obtain the display 14'.

The secure computing device 10, which can also be referred to as a secure element, enables the display of the secret 14 with the display device 18 while retaining control over this display, which means that it is possible to avoid a detour via a possibly unsecured application processor or the like or at least reduce access of the application processor to the secret information 14 in order to reduce the effects of a compromising of an application processor of this type.

Although the interfaces 16 and 22 are shown as separate interfaces, alternative designs provide to use the same interface to receive the input signal 24 and to output a control signal 26 to control the display device 16, for example in a temporal alternation or using a multiplex method.

The secure computing device 10 may have specially configured security measures in order to protect the secure computing device against unauthorized access to data and/or against a manipulation, wherein this is not absolutely necessary. Example embodiments relate to any security-critical applications to which particular attention is paid, for example at least by the user. This also includes restricted operating environments (ROEs) which are used to run trusted applications, security-critical applications, firmware and/or to operate specially secured hardware components, wherein the example embodiments are not restricted hereto, so that standard computing devices such as processors or CPUs which are used for applications of this type can also be used as secure computing devices.

Figure 2:
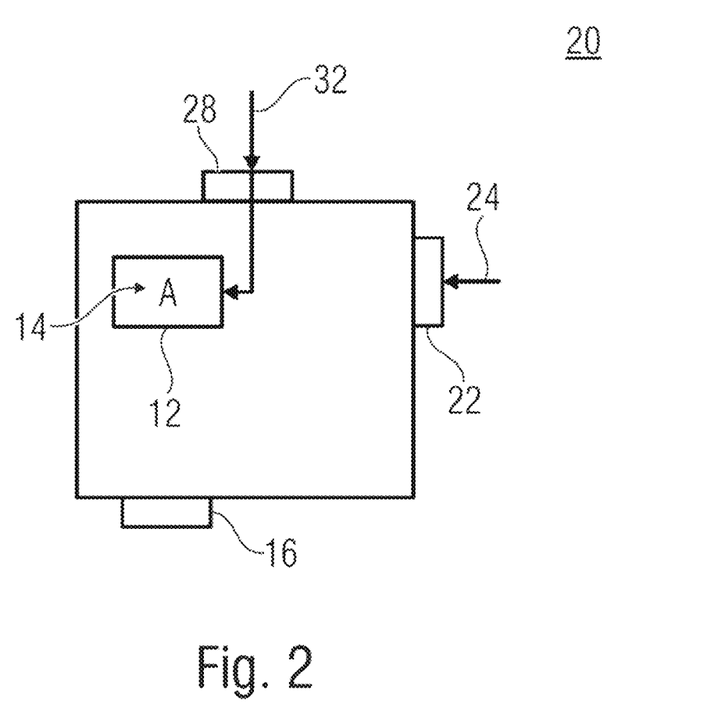
FIG. 2 shows a schematic block diagram of a secure computing device according to one example embodiment which, with reference to FIG. 1, further has an interface via which the secure computing device is designed to receive a program code.

FIG. 2 shows a schematic block diagram of a secure computing device 20 according to one example embodiment which, with reference to FIG. 1, further has an interface 28 via which the secure computing device 20 is designed to receive a program code 32 which can be stored in the storage arrangement 12. The interface 28 can be implemented as a separate interface, but can also be formed as the interface 16 and/or 22. The program code 32 can at least partially influence or determine different operating modes or functions of the secure computing device 20. This means that the program code 32 can control or determine the running of a computer-implemented application. The secure computing device 20 can be designed to store the program code 32 directly or in modified, converted or further processed form in the storage arrangement 12 in order to execute it later.

According to one example embodiment, the secure computing device 20 has an operating mode in which the display 14' of the secret 14 is effected, as described in connection with FIG. 1. The operating mode relates to a mode for processing and reproducing the secret 14, i.e. a normal operating mode.

In addition, the secure computing device 20 can have a further operating mode, for example a protected mode in which the storage of the program code 32 is enabled. The display of the secret 14 can be prevented in this operating mode. The tapping of the secret 14 via an output of the display 14' is thereby prevented at times during which a program code 32 is being loaded onto the secure computing device 20. It may be possible, for example, that the program code 32 is compromised and contains harmful code which is designed to initiate the display 14'. In the protected mode, however, a harmful function of this type can remain ineffective. The program code 32 can furthermore be verified within the protected mode so that, in the event of a return to the operating mode for indicating the display 14', it can be assumed that an uncompromised secure computing device 20 is being operated.

The secure computing device 20 can be designed in the same way as the secure computing device 10 to output the secret 14 exclusively via the interface 16 in the normal operating mode. As a result, only the output type provided for this purpose is used and a possibly maliciously induced malfunction for reading or otherwise displaying the secret 14 can be reduced or prevented in this respect.

Figure 3:
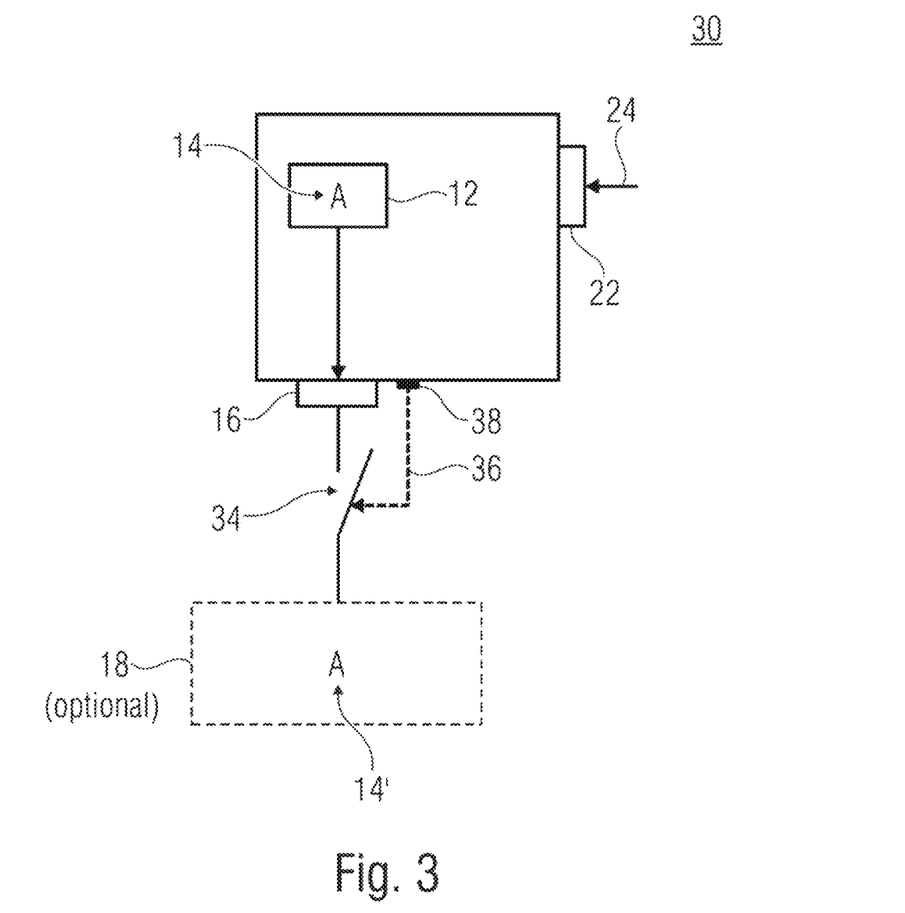
FIG. 3 shows a schematic block diagram of a secure computing device according to one example embodiment which is designed to control a switch.

FIG. 3 shows a schematic block diagram of a secure computing device 30 according to one example embodiment which can comprise, for example, the functions of the secure computing device 10 and/or the secure computing device 20. In addition, the secure computing device 30 can be designed to control a switch 34. The switch 34 can be disposed between the interface 16 and the optional display device 18 and can alternately connect the interface 16 to the display device 18 (closed state) or can cause a disconnection between the interface 16 and the display device 18 (open state). The switch 34 may be a software-based switch or a hardware-based switch. A hardware-based switch can cause a "hard" electrical connection, for example via a closing or opening of a galvanic connection. However, it is equally possible to use a semiconductor-based switch in which the conductivity is modified in parts, e.g. using a transistor or the like. The secure computing device 30 can be designed to supply a switching signal 36 to the switch 34 in order to control the state of the switch 34. The switching signal 36 can be output via an interface 38, wherein the interface 38 can be designed as a separate interface or can be implemented as an interface 16, 22 and/or 28.

The secure computing device 30 can be designed to connect the display device 18 to the interface 16 to display the secret 14 and to disconnect it at least temporarily at times during which the secret 14 is not being displayed. These times can be determined, for example, by the program code 32, and can determine the output of the corresponding switching signal 36. This means that the switching signal 36 is output on this basis, regardless of whether the secure computing device 30 does or does not provide the display 14'. In the case where the display 14' is desired or requested, the switch 34 can be transferred to a closed state. The switch 34 can be transferred at least temporarily during other times to a state which is open in relation to the interface 16. This means that no display 14' takes place in the display device 18 even if a corresponding signal is then present at the interface 16. This can not only provide a further security functionality, but can also be used so that the switch 34 enables the control of the display device 18 by a different application while it is being controlled in the open state in relation to the interface 16, which means that a different application or different element can obtain access to or control over the display element 18.

Figure 4:
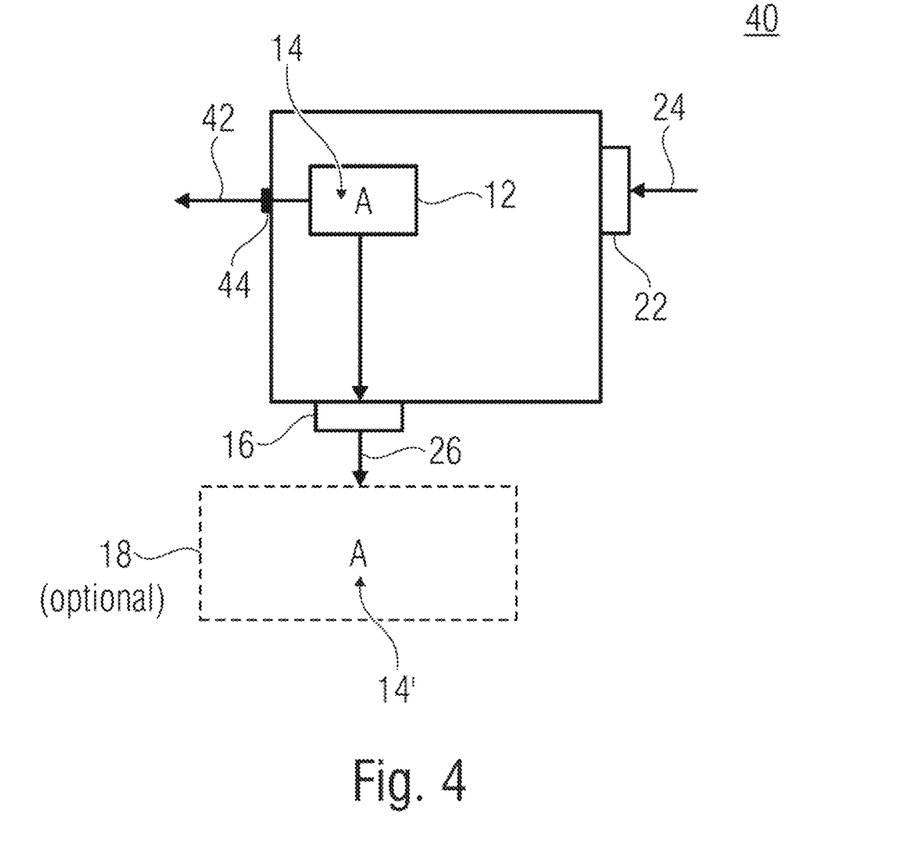
FIG. 4 shows a schematic block diagram of a secure computing device according to one example embodiment which is designed to output a status signal which indicates a control of the display device by the secure computing device.

FIG. 4 shows a schematic block diagram of a secure computing device 40 according to one example embodiment which can have the functionality of the secure computing device 10, 20 and/or 30.

The secure computing device 40 can be designed to output a status signal 42 which indicates that the secure computing device 40 is then controlling or will shortly control or has just been controlling the display device 18. For this purpose, the secure computing device 40 can have an interface 44 which can be designed as a separate interface, but can also be formed totally or partially as the interface 16, 22, 28 and/or 38.

The status signal 42 can thus comprise information indicating that the display 14' is currently being output and/or the secure computing device 40 is outputting corresponding control signals. The status signal 42 can comprise an audible, visual, haptic and/or electrical signal. The status signal 42 may, for example, be the control or output of an LED, can comprise a sound or a noise, can be designed to control an element designed for the generation thereof, or can indicate in a different manner that the secret 14 is being output or the secure computing device 40 is at least in a corresponding operating state.

With reference to FIG. 3, the status signal 42 can be output, for example, in a causal relationship with the switching signal 36 so that the closure of the switch 34 and the output of the status signal 42 are initiated. Although the example embodiments described herein are described in such a way that the status signal 42 is an active reproduction of information, for example through active output of an audible, visual, haptic and/or electrical display, the deactivation and/or an amplitude modification of the signal can alternatively also have this corresponding information, so that example embodiments are similarly related hereto.

Figure 5:
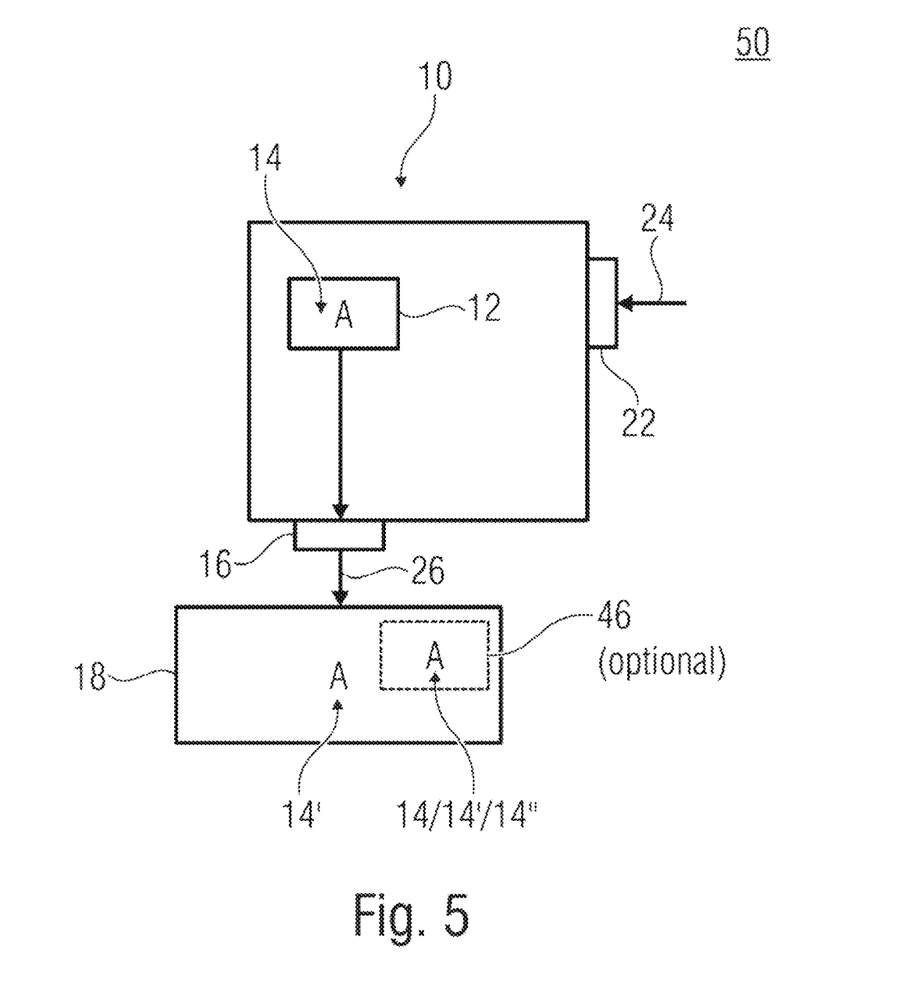
FIG. 5 shows a schematic block diagram of an apparatus according to one example embodiment.

FIG. 5 shows a schematic block diagram of an apparatus 50 according to one example embodiment which comprises, for example, the secure computing device 10, but can alternatively or additionally also comprise the secure computing device 20, 30 and/or 40. The apparatus 50 further comprises the display device 18 which is described below for clear understanding as an LED device, but is not restricted hereto, as described in connection with FIG. 1.

The apparatus 50 can be designed to output the display 14' with the display device 18, e.g. in response to the input signal 24. The secure computing device 10 is designed to take control at least temporarily of the display device 18. This can be done, for example, using the switch 34, as described in connection with FIG. 3. If, for example, the control of the display device 18 is transferred temporarily to a different device, for example an application processor or a different computing unit whose security is possibly not guaranteed, the apparatus 50 can provide further functions. The display device 18 can thus, for example, have a display memory or screen memory 46 which is configured to receive information relating to the display 14'. This may involve, for example, the secret 14, the display 14' or information 14" derived from at least one of these information elements. The display device 18 may, for example, have its own control which is designed to perform a conversion or translation of the control signal 26 for the possibly graphical display of the display device 18. This conversion can be designed, for example, so that a bit sequence received with the control signal 26, e.g. the secret 14 or information relating to the graphical display itself, e.g. a digit sequence or a QR code, can be converted into an instruction determining which LED of the display device 18 is to be controlled with which color and/or intensity. This can also comprise a scaling of the display size or the like.

The presence of the screen memory 46 can potentially result in the secret 14 or information derived herefrom being stored at least temporarily in the screen memory 46. Particularly in conjunction with the temporary transfer of control of the display device 18 to a different device/application, this could jeopardize the security of the secret 14. The secure computing device of the apparatus 50 can be designed to erase the screen memory 46 before the display 14' of the secret 14 and before a transfer of the control of the display device 18 to this different device, e.g. the application computing device. This can prevent or at least hinder corresponding access to this information.

Figure 6:
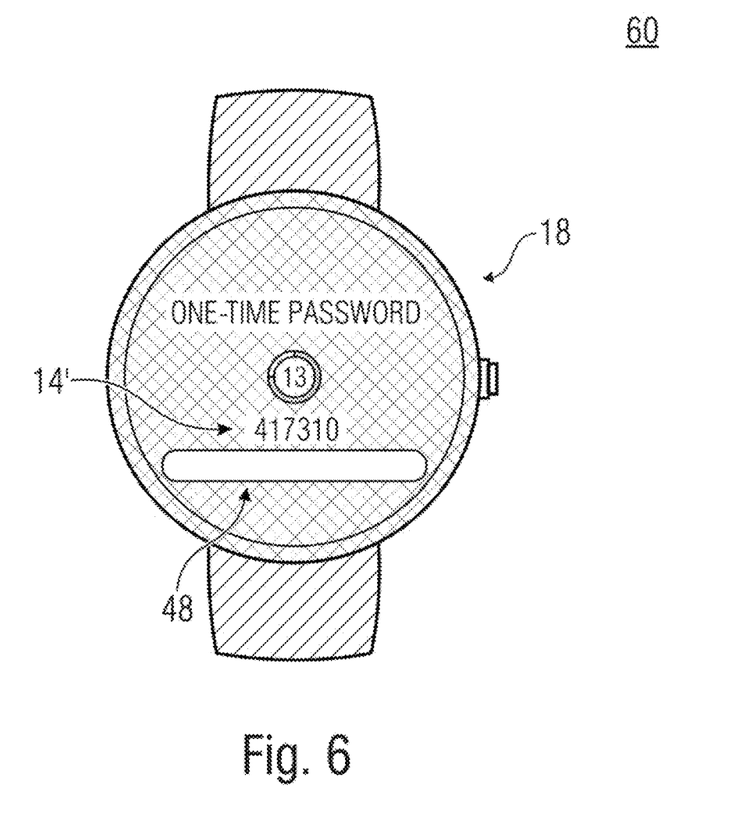
FIG. 6 shows a schematic representation of an apparatus according to one example embodiment in which the display device is formed as a display.

FIG. 6 shows a schematic representation of an apparatus 60 according to one example embodiment to which the explanations in connection with the apparatus 50 apply. The display device 18 is formed, for example, as a display, while the apparatus 60 is formed as a watch, for example a smartwatch. The display 14' is, for example, a single-use password, which can also be referred to as a one-time password. The display device 18 can also present additional information along with other information such as the designation of the display 14', a validity of the information or further graphical display elements 48.

Figure 7:
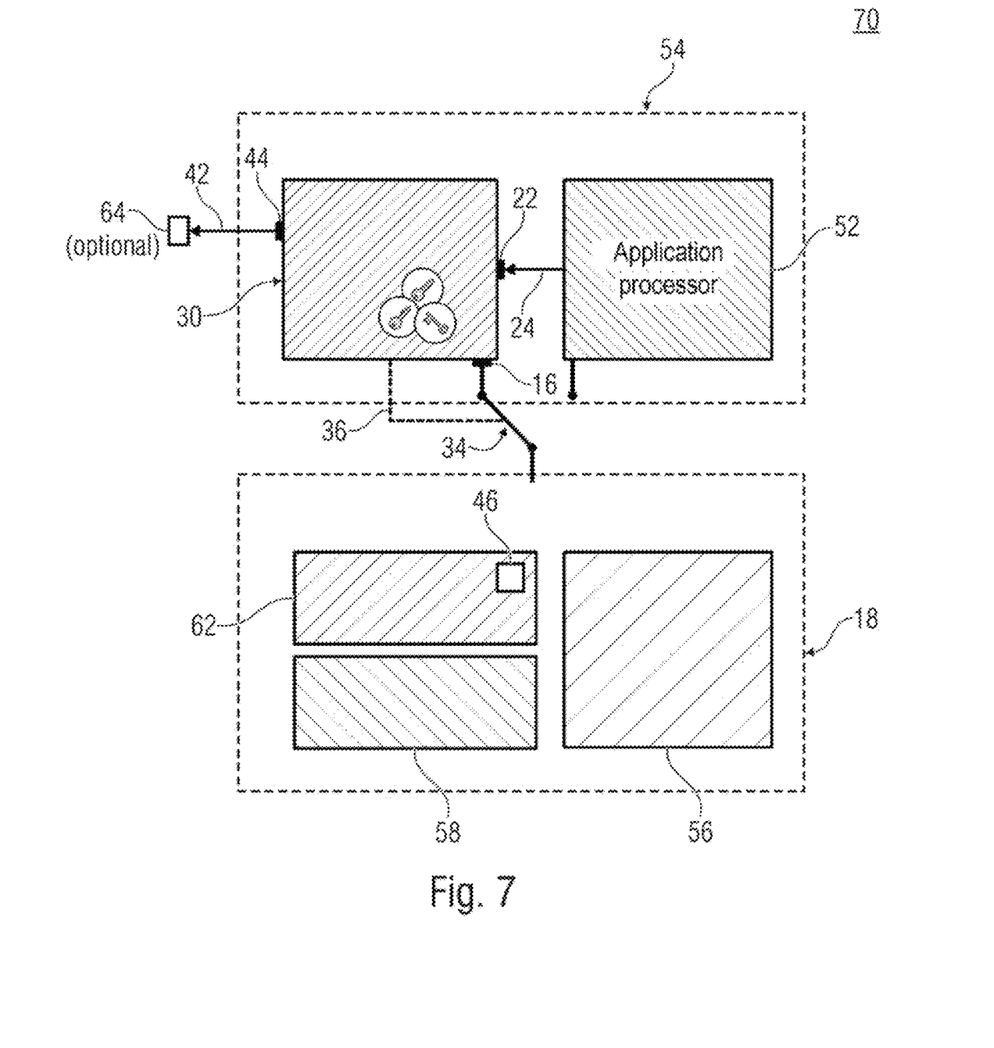
FIG. 7 shows a schematic block diagram of an apparatus according to one example embodiment which has an application computing device which is designed to run one or more applications of the apparatus.

FIG. 7 shows a schematic block diagram of an apparatus 70 according to one embodiment which has, for example, a secure computing device 30 but, alternatively or additionally, can have any other secure computing device, e.g. the secure computing device 10, 20 and/or 40. The apparatus 70 comprises an application computing device or application processor 52 which is designed to run one or more applications of the apparatus 70 or to provide calculations or services. The application computing device 52 can comprise, for example, an ARM processor. The application computing device 52 can be designed to execute computer-implemented instructions, e.g. in order to run a computer-based application. The application computing device 52 can be connected to the interface 22 and can indicate through transmission of the input signal 24 that a display of the secret 14 or information derived herefrom is required, e.g. in connection with a payment transaction, an encryption procedure or a transfer or the like. The computer-based application can thus request temporary access to the secret 14 and provide it for the display of this requirement of the input signal 24 for the secure computing device 30. The apparatus 70 can optionally use the status signal 42 to indicate that the secret 14 is being displayed.

The secure computing device 30 and the application computing device 52 which possibly does not have its own security precautions to the same extent as the secure computing device 30 can jointly form at least a part of a computing unit 54 of the apparatus 70. The computing unit 54 can be designed to control the display device 18, wherein this is performed, for example, alternately by the secure computing device 30 or the application computing device 52, possibly using the switch 34. The use of the switch 34 can enable a one-way or two-way connection, so that inputs on the display device 18 can be transmitted via software-implemented and/or hardware-implemented input interfaces 56 to the computing unit 54. This may involve, for example, displayed keys or areas on the display or additionally disposed keys, buttons or signal inputs. The display device 18 can further have a display element/display 58 which is controllable via a display control 62, wherein the display control 62 can comprise the screen memory 46 or can at least have access hereto.

The apparatus 70 enables a design in which a need for the output or display of the secret 14 can be generated or signaled by the application computing device 52, although the application computing device 52 has no direct access to the secret 14. Instead of a request for the secret 14 and a control of the display element 18 for the display of the secret by the application control device 52, a secure design is enabled. The transmission of the secret 14 from the secure computing device which is considered to be secure to the application processor could have vulnerabilities such that the security of the application control device 52 cannot be guaranteed at all times, particularly due to changing program codes and/or rights to change or update these program codes. The apparatus 70 is designed so that the secure computing device 30 takes over control at least partially of the display device 18 and displays the secret 14 there under the control of the display device 18. This can entail erasing the screen memory 46 before or after the display in order to avoid start code stored by the application computing device 52 in the screen memory 46 being influenced and/or the secret 14 being read from there following the return of control to the application computing device 52.

The secure computing device 30 can be designed to take control of the display device 18 and withdraw control of the display device 18 from the application computing device 52 during a first time interval. The secure computing device 30 can transfer control of the display device 18 to the application computing device 51 or to a different computing device during a second time interval disjoint from said first time interval. To enable this, the secure computing device 30 takes control of the switch 34 in relation to an element for the unambiguous definition of a control of the display device 30.

Since the secure computing device 30 takes control of the switch 34, a manipulation of the switch control by the application computing device 51 can be prevented or hindered. The secure computing device 30 can be designed to control the switch 34 in such a way that it connects the display device 18 to the interface 16 to display the secret 14 and disconnects it from the interface 16 at least temporarily at times when the secret 14 is not to be displayed. This enables a further security aspect, since at times when the secure computing device 30 does not display the secret, for example in response to a request by means of the input signal 24, a corresponding defective output to the display is also prevented. This means that, even if the secure computing device 30 is manipulated in such a way that information associated with the secret 14 is output at the interface, this remains without effect due to the lack of a connection to the display device 18.

The apparatus 70 comprises an optional display element 64 which can be operated, for example, via the interface 44. The secure computing device 30 can be designed to output the status signal 42 during the time interval in which the secure computing device 30 controls the display device 18, said status signal being designed to control the display element 64. The display element 64 can thus indicate that the secure computing device 30 is currently controlling the display device 18. This can indicate to the user that secret information is currently being displayed, in particular due to a causal link between the switch setting and the status signal 42. This enables the user to output information indicating that his secret information is currently visible, even if the secure computing device 30 is compromised.

The apparatus 70 can be formed as any apparatus, for example as a mobile or immobile apparatus. Example embodiments relate to a portable/wearable apparatus, wherein "portable/wearable" is to be understood to mean that a dimension of the apparatus can be obtained within a virtual cube having an edge length of 1 meter and/or a weight of less than 10 kilos, less than 5 kilos or less than 1 kilo is configured. Examples of a portable/wearable apparatus are, for example, a portable computer or laptop, a tablet computer, a smartwatch, a smartphone, smart glasses or the like.

In other words, the secure computing device has direct access to the display device 18, which means the display 58 and/or the buttons 56. Due to the control of access to the display device 18, the apparatus can be designed in such a way that only the secure computing device has an influence on who has access to the display device 18. According to one example embodiment, the application computing device 52 informs the secure computing device 30 that a security-relevant task is to be performed and hands over control to the secure computing device, e.g. by means of the input signal 24. The secure computing device controls the apparatus 70 in such a way that a connection between the application computing device 52 and the display device 18 is interrupted and even the control over the display device 18 is taken over. The secure computing device can output a display on the display device 18 and can erase an optional memory of the display device 18 before and/or after this. The secure computing device 30 can then hand back control over the display device 18 to the application computing device 52. Instead of a graphical display, any other interface can be used for which an encrypted communication is at least barely implementable, for example loudspeakers or the like. A signal can optionally be output to the user indicating that the secure computing device 30 is currently exercising control over the display device 18.

With reference to example embodiments of this type, a smartwatch, for example, can be used as a virtual wallet, e.g. for cryptocurrencies. A private key of the virtual wallet can be displayed by means of a QR code, thus enabling the exchange of a currency of this type. However, example embodiments are not restricted hereto, but relate to any sensitive information. Examples of this include the aforementioned cryptocurrencies, a random number for generating a backup, a password, in particular a one-time password (OTP) a PIN (Personal Identification Number) a PUK (Personal Unlock Key) or the like. The increasing proliferation of Internet connections for such devices forms a basis for possible attacks on sensitive information of this type. Since the secret information is sometimes to be displayed in such a way that it can be recognized by a different apparatus or user, a decryption is called for, so that an encryption of secret information is not possible at all times. Even if a secure computing device is considered to be secure, the output of unencrypted sensitive information is a topic which is addressed with the example embodiments described herein.

Example embodiments enable the number of shared resources to be minimized, thereby reducing the risk of remote attacks.

Although some aspects have been described in connection with an apparatus, these aspects obviously also represent a description of the corresponding method, so that a block or a component of an apparatus is also to be understood as a corresponding method step or as a feature of a method step. By the same token, aspects which have been described in connection with or as a method step also represent a description of a corresponding block or detail or feature of a corresponding apparatus.

Depending on specific implementation requirements, example embodiments of the disclosure can be implemented in hardware or in software. The implementation can be performed using a digital storage medium, for example a floppy disk, a DVD, a Blu-ray disc, a CD, a ROM, a PROM, an EPROM, an EEPROM or a FLASH memory, a hard disk or other magnetic or optical storage device on which electronically readable control signals are stored which can interact or interact with a programmable computer system in such a way that the respective method is carried out and/or corresponding signals are output via the described interfaces. The digital storage medium can therefore be computer-readable.

Example embodiments of the present disclosure can generally be implemented as a computer program product with a program code, wherein the program code is effective in carrying out one of the methods if the computer program product runs on a computer, and/or in correspondingly controlling an apparatus described herein. The program code can also be stored, for example, on a machine-readable medium.

In other words, one example embodiment of the method according to the disclosure is thus a computer program which has a program code to control an apparatus described herein if the computer program runs on a computer. A further example embodiment of the methods according to the disclosure is therefore a data medium (or a digital storage medium or a computer-readable medium) on which the computer program for carrying out one of the controls, i.e. methods, described herein is recorded.

A further example embodiment of the method according to the disclosure is therefore a data stream or a sequence of signals which represent(s) the computer program for carrying out one of the methods described herein. The data stream or the sequence of signals can be configured, for example, to be transferred via a data communication connection, for example via the Internet.

A further example embodiment comprises a processing device, for example a computer or a programmable logic component, which is configured or adapted to carry out one of the methods described herein.

A further example embodiment comprises a computer on which the computer program for carrying out one of the methods described herein is installed.

In some example embodiments, a programmable logic component (for example a field-programmable gate array (FPGA) can be used to perform some or all of the functionalities of the methods described herein. In some example embodiments, a field-programmable gate array can interwork with a microprocessor in order to carry out one of the methods described herein. Generally speaking, the methods are carried out in some example embodiments by means of any hardware apparatus. This may be universally usable hardware such as a computer processor (CPU) or hardware specific to the method, such as, for example, an ASIC.

The example embodiments described above merely represent an illustration of the principles of the present disclosure. Modifications and variations of the arrangements and details described herein will obviously be apparent to other persons skilled in the art. The disclosure is therefore intended to be restricted only by the protective scope of the following patent claims and not by the specific details which have been presented herein on the basis of the description and the explanation of the example embodiments.

The invention claimed is:

1. A secure computing device, comprising:
a storage cluster configured to store a secret;
a first interface configured to send a control signal to control a display;
a second interface configured to receive an input signal having information which causes a prompt to display the secret;
a third interface configured to receive a program code to run a computer-implemented application,
wherein the secure computing device is configured to store the program code in the storage cluster, to read the secret from the storage cluster based on the input signal, and to control the display via the first interface such that a display of the secret is effected; and
a switch coupled between the first interface and the display, wherein the secure computing device is configured to control the switch such that the switch connects the first interface to the display to enable display of the secret, and disconnects the first interface from the display to prevent display of the secret even when the first interface would have otherwise sent the control signal.

2. The secure computing device as claimed in claim 1, comprising:
an operating mode during which the display of the secret is effected, and
a protected mode during which the storage of the program code in the storage cluster is enabled, and the display of the secret is prevented.

3. The secure computing device as claimed in claim 2, wherein the secure computing device is formed as a secure element.

4. The secure computing device as claimed in claim 2, wherein the secure computing device is designed to output a signal via an interface, said signal indicating that the secure computing device is currently controlling the display.

5. The secure computing device as claimed in claim 2, wherein the secret comprises a password, a token, a private key or a random number.

6. The secure computing device as claimed in claim 1, wherein the secure computing device is configured to output the secret exclusively via the first interface in an operating mode during which the display of the secret is effected.

7. The secure computing device as claimed in claim 1, wherein the secure computing device is formed as a secure element.

8. The secure computing device as claimed in claim 1, wherein the secure computing device is designed to output a signal via an interface, said signal indicating that the secure computing device is currently controlling the display.

9. The secure computing device as claimed in claim 1, wherein the secret comprises a password, a token, a private key or a random number.

10. An apparatus, comprising:
a secure computing device as claimed in claim 1; and
the display coupled to the first interface.

11. The apparatus as claimed in claim 10, wherein the secure computing device is designed to take control temporarily of the display in order to display the secret and to erase a memory of the display in which information for displaying the secret is stored before a display of the secret or before a transfer of control of the display to an application computing device of the apparatus.

12. The apparatus as claimed in claim 10, wherein the display comprises a screen and a screen memory, designed to store information for displaying the secret.

13. The apparatus as claimed in claim 10, comprising:
an application computing device connected to the second interface and configured to execute computer-implemented instructions in order to run a computer-based application.

14. The apparatus as claimed in claim 13, wherein the computer-based application is designed to request at least temporary access to the secret and provide the input signal for the secure computing device.

15. The apparatus as claimed in claim 10, wherein the secure computing device is designed to take control over the display and to withdraw control of the display from an application computing device during a first time interval in order to transfer control of the display to an application computing device during a second time interval.

16. The apparatus as claimed in claim 10, wherein the secure computing device has a fourth interface designed to control the switch, wherein the switch is a software-based switch.

17. The apparatus as claimed in claim 10, comprising:
a display element,
wherein the secure computing device has a fifth interface and is designed to output a signal to control the display element during a time interval in which the secure computing device controls the display, said signal indicating that the secure computing device is currently controlling the display.

18. The apparatus as claimed in claim 10, wherein the apparatus is formed as a smartwatch or a smartphone.

19. The secure computing device as claimed in claim 1, wherein the secret comprises a password, a token, a private key or a random number.

20. The secure computing device as claimed in claim 1, wherein the third interface is configured to receive a program code when the secure computing device is in an execution state.

\* \* \* \* \*